Nov. 24, 1953
H. JAGGER
2,659,930
SHRIMP PEELING MACHINE
Filed Aug. 22, 1951
5 Sheets-Sheet 1
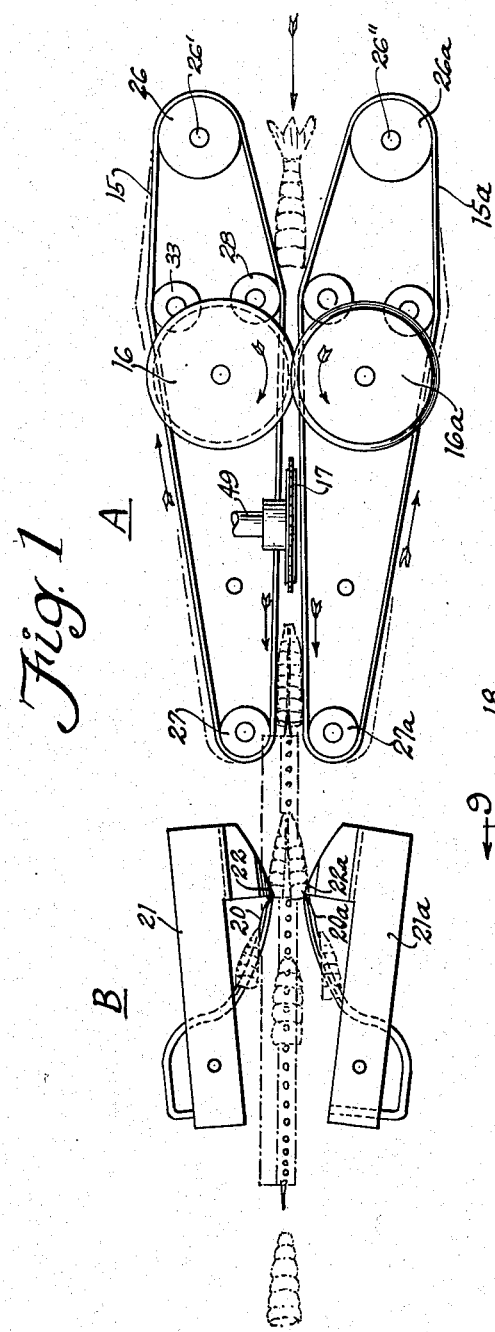
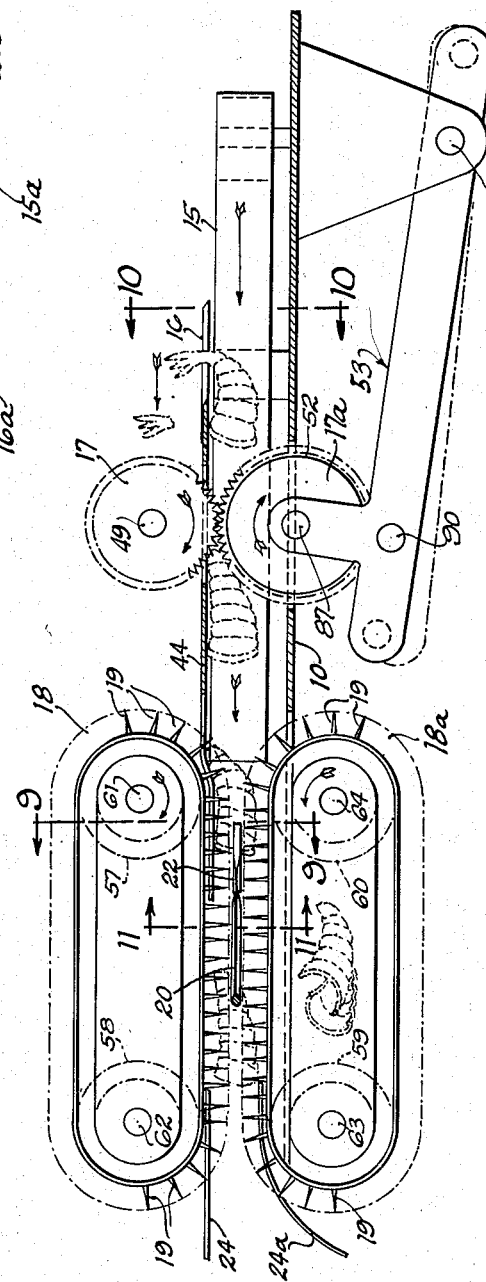
INVENTOR.
Hubert Jagger
BY
Sheridan, Davis & Cargill
Att'ys Nov. 24, 1953

H. JAGGER 2,659,930

SHRIMP PEELING MACHINE

Filed Aug. 22, 1951

INVENTOR.
Hubert Jagger
BY
Sheridan, Davis & Cargill
Att'ys

Nov. 24, 1953  H. JAGGER  2,659,930
SHRIMP PEELING MACHINE
Filed Aug. 22, 1951  5 Sheets-Sheet 3

INVENTOR.
Hubert Jagger
BY
Sheridan, Davies & Cargill
att'ys

Nov. 24, 1953  H. JAGGER  2,659,930
SHRIMP PEELING MACHINE
Filed Aug. 22, 1951  5 Sheets-Sheet 4

INVENTOR.
Hubert Jagger
BY
Sheridan, Davis & Cargill
Att'ys

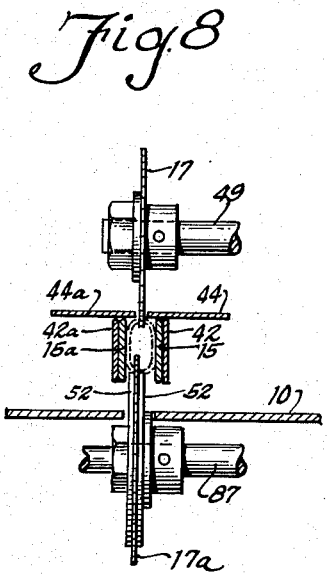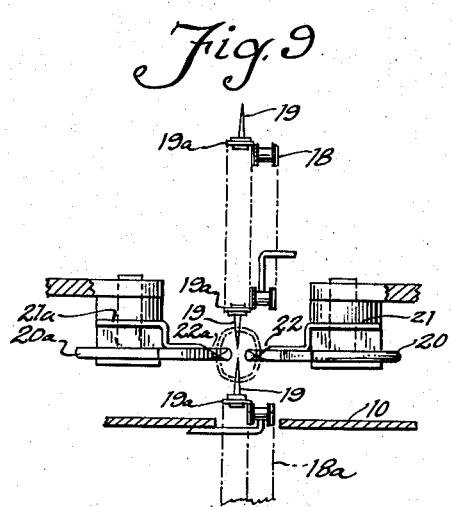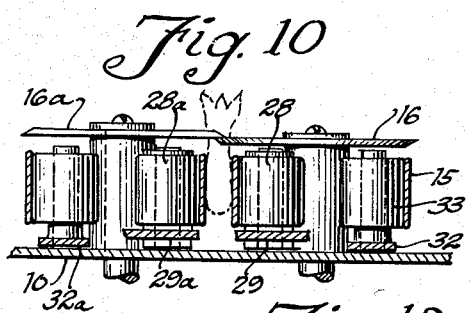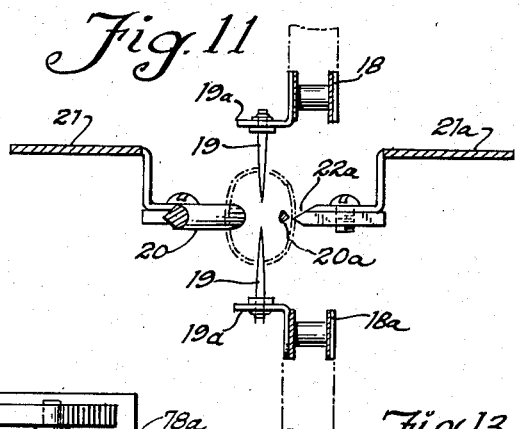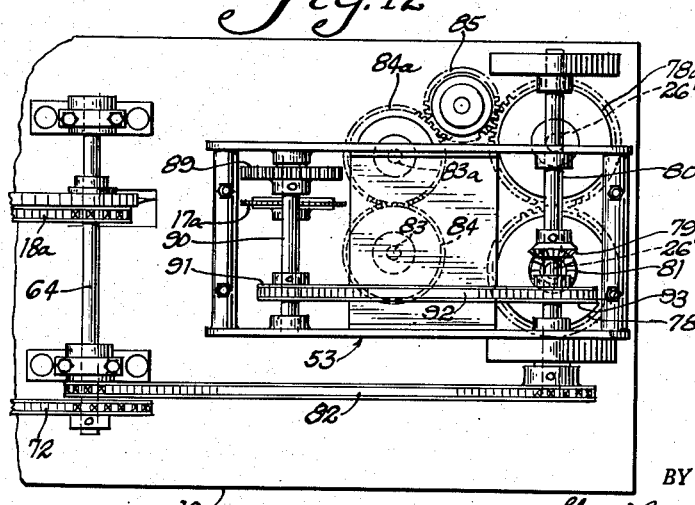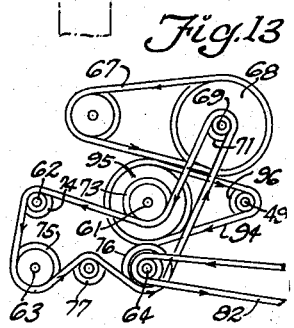
INVENTOR.
Hubert Jagger Patented Nov. 24, 1953

2,659,930

UNITED STATES PATENT OFFICE 2,659,930

SHRIMP PEELING MACHINE

Hubert Jagger, Maywood, Ill.

Application August 22, 1951, Serial No. 243,010

9 Claims. (Cl. 17—2)

This invention relates to improvements in shrimp peeling machines.

Fresh shrimps often are shipped to fish stores, restaurants and other purveyors of such food with the heads removed but with the shells and tails intact. While various tools and machines have heretofore been designed for use in removing the shells, insofar as we are aware no machine has gone into general use for removing the shells and tails or which performs those operations satisfactorily. Hence, these chores generally are performed by hand, including the removal of the so-called sand vein or intestine which is located in the flesh along the backs of the shrimps.

Several factors render difficult the removal of the shells from shrimps by automatic mechanism. For example, the shrimps are somewhat slimy and hence slippery. They are larger in girth at the forward end and taper to a relatively small diameter at the juncture of the body and the tail. The shells are relatively tough, although segmented, while the flesh is relatively easily torn or mutilated. The shrimps of a usual batch, although in a particular size class, may vary considerably in size and hence a machine for removing the shells must accommodate itself to the different sizes of the shrimps as they are operated on by the machine. Furthermore, in a beheaded shrimp, the flesh at the forward end of the body often protrudes laterally beyond the forward edge of the shell which interferes with engagement of the shell by machine instrumentalities designed to effect removal of the shells as the shrimps move in relatively rapid succession through the machine.

One object of the present invention is to provide a machine into which shrimps of non-uniform sizes can be fed in succession and having means for removing the sand veins and shells and preferably the tails as the headless bodies of the shrimps move uninterruptedly through the machine.

A more specific object of the invention is to provide a machine of the character mentioned having means for slitting the shells along the back and belly of the shrimps from end to end to condition the shells for subsequent removal and for removing the sand veins or freeing or making accessible any unremoved fragments of the veins for subsequent complete removal by a washing operation, and means associated with the slitting means for aligning successive shrimps of different sizes with the slitting means and conveying the shrimps to a second conveyor which directly engages the flesh of the bodies by way of said slits for moving the bodies to and through apparatus for stripping the slitted shells from the bodies.

An additional object of the invention is to provide, in a machine of the class described, means for slitting the shells of shrimps along the backs and bellies to uniform depths, including mechanism for adjusting the slitting means to positions for effecting that result notwithstanding differences in sizes of the shrimps being fed into the machine.

Another object of the invention is to provide a pair of peeling devices for stripping the slitted shells from the shrimp bodies as they pass in succession through a peeling station of the improved machine, and control mechanism for constraining the devices to move in unison to positions for engaging the shells at the forward ends of the shrimp bodies and to follow the changing contours of each body throughout the length of the latter, all notwithstanding variations in sizes of successive shrimps.

Additional objects of the invention relate to various features of construction and arrangement of parts which will be apparent from a consideration of the following specification and accompanying drawings wherein:

Figure 1 is a plan view of the new machine showing somewhat diagrammatically at the right of the figure a means responsive to the size of successive shrimps for feeding shrimps into the mechanism which removes the tails (preferably) and slits the shells at the top and bottom, along the backs and bellies, respectively, and from which the shrimps pass in succession to shell stripping means, shown at the left of the figure, which removes the slitted shells from the bodies;

Fig. 2 is a side elevational view of the mechanism shown in Fig. 1, also shown somewhat diagrammatically;

Figure 3:
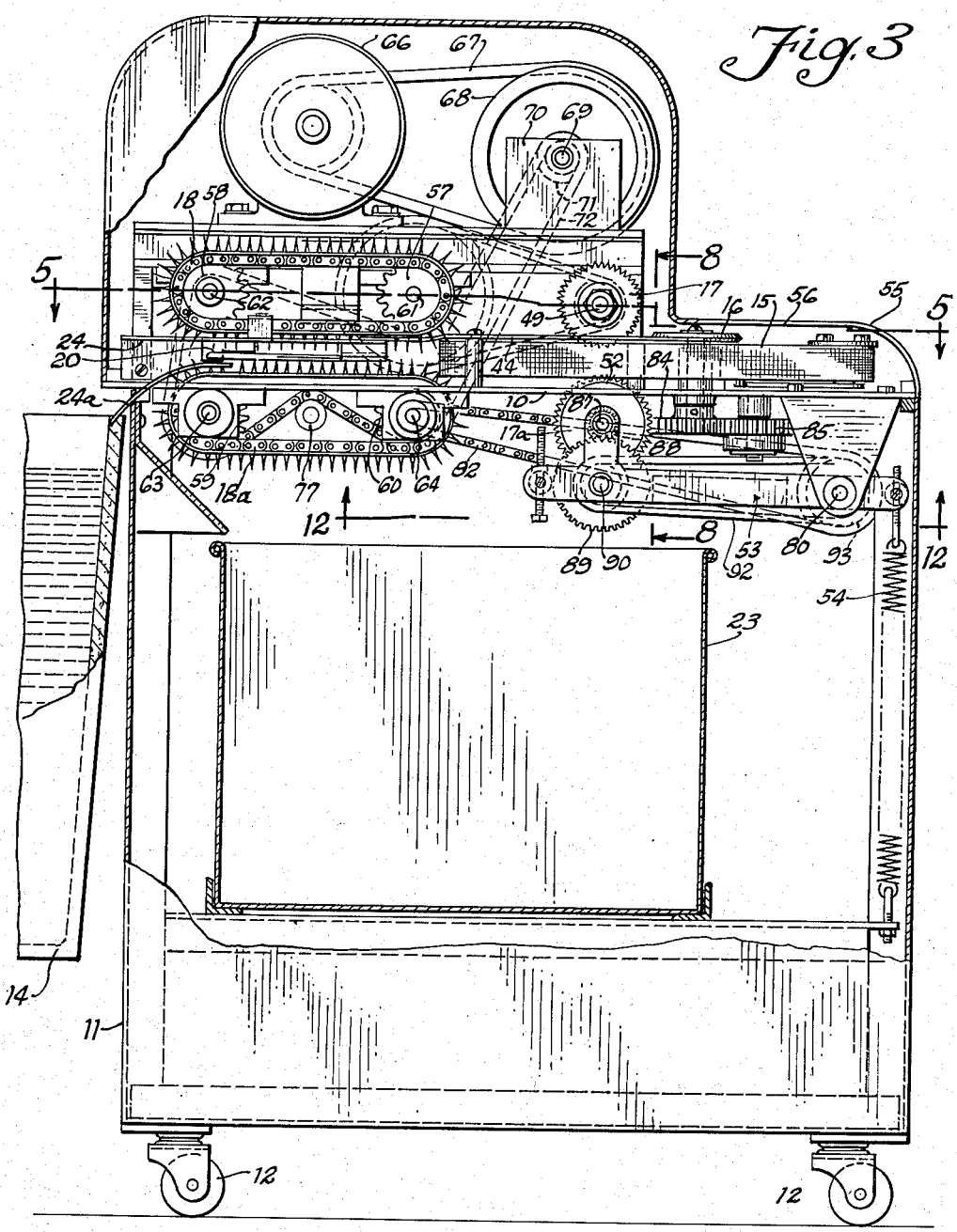
Fig. 3 is a side elevational view of the improved machine, some parts being broken away or shown in section for the purpose of clarity of illustration.
Figure 6:
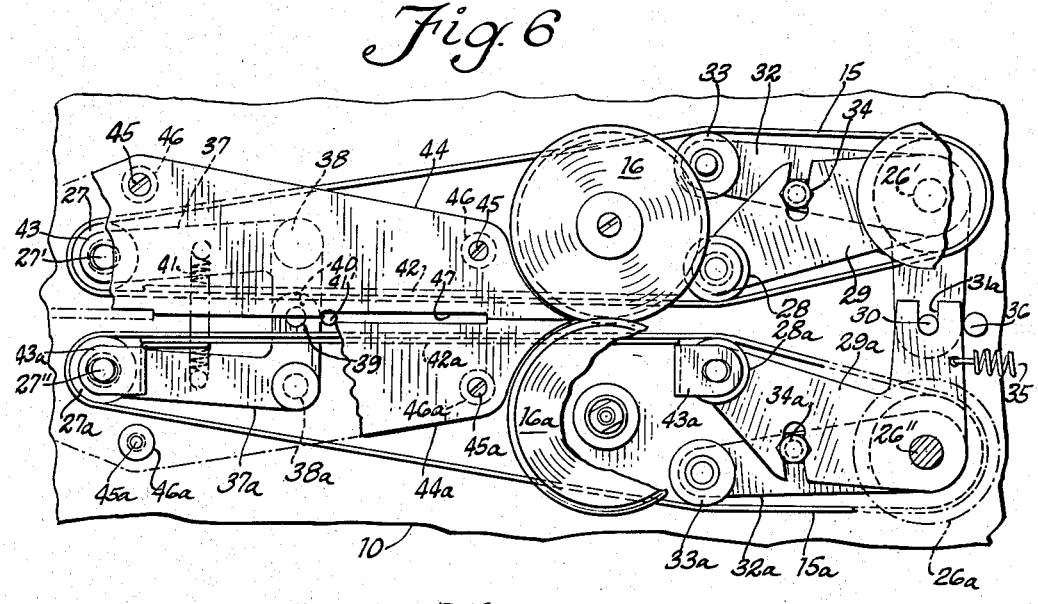
Figure 7:
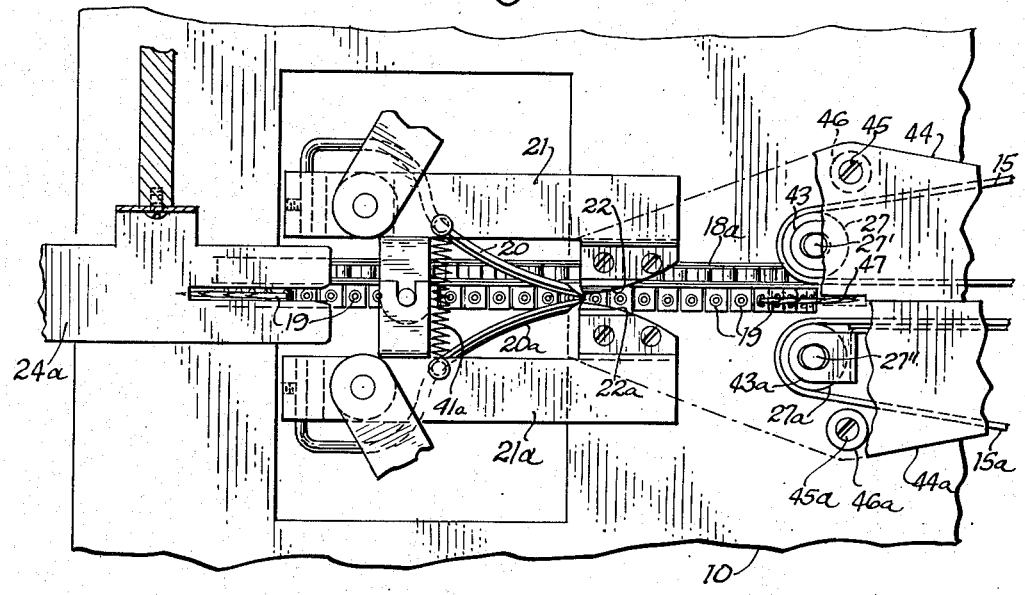

Fig. 6 is an enlarged plan view of the right-hand portion of the machine shown in Fig. 1, i. e., the in-feeding, de-tailing and slitting mechanism and the self-adjusting or compensating arrangement whereby the feeding belts are equally or symmetrically adjusted with respect to a vertical plane through the slitting saws not only in response to shrimp of different sizes but in response to the varying contours of the individual shrimps as they move from right to left;

Fig. 7 is a left-hand extension of Fig. 6 and illustrates the shrimp peeling means and associated shrimp conveyor mechanism;

Fig. 8 is a broken vertical section on an enlarged scale illustrating the slitting saws, the view being taken on line 8—8 of Fig. 3;

Fig. 9 is an enlarged vertical sectional view taken on line 9—9 of Fig. 2;

Fig. 10 is a broken enlarged sectional view taken on line 10—10 of Fig. 3;

Fig. 11 is an enlarged broken sectional view taken on line 11—11 of Fig. 2;

Fig. 12 is a bottom view illustrating parts of the driving or operating mechanism as viewed in the direction of the arrows designating line 12—12 in Fig. 3; and Fig. 13 is a diagrammatic representation of a portion of the drive arrangement.

The machine comprises two associated shrimp conveyor systems or sub-assemblies indicated by letters A and B in Fig. 1. The mechanism constituting the assemblies A and B is supported primarily by a horizontal plate 10 shown in Fig. 3 which, in the particular embodiment of the invention illustrated in said figure, is supported by a base or cabinet-like structure 11 which is mounted on casters 12 by means of which the mechanism may be moved to a convenient position for operation as, for example, adjacent a washing receptacle 14 into which the shelled shrimp are adapted to be discharged by the machine for subsequent washing. Referring again to Fig. 1, the structure therein illustrated more or less diagrammatically comprises a cooperating pair of two endless belts 15, 15a which are arranged to engage shrimp fed manually or, if preferred, automatically to the machine for constraining the shrimps for movement from right to left beneath a pair of tail severing blades 16, 16a, the adjacent edges of which overlap, as shown in the figure, whence the machine carries the shrimp into contact with a pair of rotary slitting devices shown in the form of saws 17, 17a (see Fig. 2) which slit the shell of each shrimp passing between the saws longitudinally along the belly and back to form kerfs of predetermined depth, whence the shrimp passes under control of the adjacent runs of the belts into section B of the mechanism.

Section B has parts which cooperate to remove the slitted shell from the shrimp body. This section B comprises essentially two endless needle bearing chains 18, 18a in the form of sprocket chains passing over sprockets later referred to and each having a series of sharp pointed needles or pins 19 carried by angular plates 19a secured to the links of the chain. The needles 19 of each chain 18, 18a are, as viewed in Fig. 11, disposed in the same vertical plane or substantially the same plane and are designed to enter the upper and lower kerfs formed by the saws 17, 17a and impale the flesh of the shrimp without penetrating the shell sections and hence leaving the shell sections free to be stripped from the body as the latter is moved forwardly or to the left in Figs. 1–5. As shown in Figs. 1 and 2, a shrimp body will be impaled on the needles as it is about to leave engagement between the belts 15, 15a and will be conveyed from right to left as viewed in said figures into engagement with a pair of peeler members indicated generally by numerals 20, 20a. These peeler members 20, 20a are mounted on feeler members 21, 21a which are arranged to engage the forward ends of the shrimps as they move into peeling position and thus move the operative or pointed ends of the peeler members 20, 20a into position for engaging the forward ends of the shrimps immediately inwardly of the shells. As shown in Fig. 1, the pointed ends of the peeler members 20, 20a are located inwardly slightly beyond the adjacent portions of the feeler members. The said adjacent portions of the feeler members are sharpened to form cutting edges 22, 22a which are designed to cut through the flesh of the shrimp which generally or frequently protrudes over the end of the shell at the plane where the head was severed. This arrangement enables the edges 22, 22a to engage the forward edges of the shell and thus effect disposition of the pointed ends of the peelers 20, 20a at positions for engaging closely inwardly of the shells whereby as the impaled body of the shrimp is advanced from right to left by the needle chains, the severed halves of the shell are stripped from the shrimp and are deposited in a suitable receptacle 23 beneath the mechanism. The shrimp body proceeds to the end of the needle conveyors where it is released from the needles by releasing members 24, 24a in the form of metal strips each having a longitudinal slit therein for accommodating movement of the needles which, being part of the chains pass around the respective sprockets which carry the needle chains at the left hand end of the section B.

The belt conveyors 15, 15a at the right-hand end of the machine, as viewed in Fig. 1, pass around pulleys 26, 26a respectively and around pulleys 27, 27a at the opposite ends of the conveyors. The latter pulleys are idler pulleys, while pulleys 26 26a are driven, as will be later described. Each of the belt conveyors is provided with means for retaining the belts 15, 15a in a suitably taut condition and which permit the adjacent runs of the belt which engage the shrimps to move toward or away from a center line between said runs automatically in response to the size of a particular shrimp being moved between the belts. As shown in Fig. 6, a pulley 28 is carried by an L-shaped arm 29 which is pivotally mounted on the shaft 26' upon which the pulley 26 is mounted and at the opposite end of the arm it carries a vertical stud 30. A pulley 28a is mounted on a similar L-shaped arm 29a mounted on the shaft 26'' of the belt pulley 26a and is provided with a slot 31a at its opposite end which receives the pin or stud 30. An arm 32 at one end carries a pulley 33 and at the opposite end is mounted for swinging movement on the shaft 26' of the pulley 26. The arm 32 is provided with a threaded stud having a nut 34 thereon, the stud being received within an arcuate slot provided in arm 29. By the construction shown, the pulleys 28 and 33 can be moved apart for tightening the belt to the proper tension after which tightening the nut 34 will hold the two arms 29 and 32 relatively rigid and hence movable arcuately in unison about the shaft 26' as a center.

The arm 32a is pivotally mounted on the vertical shaft 26'' of the pulley 26a and at its opposite end carries a pulley 33a. This arm is likewise adjustable relative to the arm 29a when a nut 34a on a stud in an arcuate slot in arm 29a has been loosened for the purpose of properly tensioning the belt 15a, after which the arms 29a and 32a are swingable in unison about the pivot shaft 26″ above mentioned. A spring 35 is shown in Fig. 6 secured to the short end of the arm 29a and is suitably anchored at the other end and tends to pull the arm to the right as viewed in Fig. 6, which, due to the cooperation of the pin 30 within the slot 31, tends to swing the short arm of lever 29 in the same direction. Such movement of the arms 29 and 29a under the action of the spring 35 tends to move the pulleys 28, 28a closer together. However, since pulleys 33 and 33a move with the arms, such movement does not vary the tension of the belt. A removable shield, not shown, is positioned over the arms and the spring and stud during use of the machine, the arms being located close to the surface of the plate 10.

As shown in Figs. 1 and 6, the adjacent runs of the belts converge in passing from the driven rollers 26, 26a to the idler rollers 28, 28a. When the short arms of the levers 29, 29a are retained by the spring 35 against a stop 36 (see Fig. 6), the inner runs of the belts are relatively closely spaced together, such spacing being sufficient to engage the sides of the smallest size shrimps adapted to be peeled by the illustrated machine. When larger size shrimps are fed between the belts, that is, from right to left, the inner runs of the belts, by reason of the above described compensating arrangement, can move apart to accommodate such larger bodies.

The opposite or left-hand ends of the belts 15, 15a are provided with similar compensating structures. As shown in Fig. 6, the pulleys 27, 27a are respectively mounted on vertical studs or shafts 27′, 27″ carried by the left-hand ends of arms 37, 37a, the arms being pivotally secured at 38, 38a to the plate 10. The short ends of the L-shaped arms are interengaged by means of a stud 39 secured to arm 37a which stud is received within a slot 40 in the adjacent end of the arm 37. A helical spring 41, under tension, extends between the arms 37, 37a which tends to draw rollers 27, 27a one toward the other to substantially the position shown in Fig. 6 where the short ends of the arm abut a limiting stop 41′. The passage of a shrimp of greater thickness than the distance between the inner runs of the belts 15, 15a shown in Fig. 6 enables the left-hand portions of the belts to move apart each in a like degree (similarly to the right-hand portions of the belts), whereby the shrimp body is moved in a straight line corresponding to a center line between the inner runs of the belts as shown in Fig. 6.

Extending between the pulleys 27a and 28a of the conveyor 15a is a backing plate 42a which lies immediately adjacent the inner face of the inner run of the belt. The backing plate 42a is shown as provided with ears 43a at each end containing elongate holes by means of which the plate is mounted on the respective pulley axes, the elongate holes avoiding binding as the parts are moved arcuately. The backing plate 42a prevents inward bowing of the inner run of the belt 15a as it moves from pulley 28a to pulley 27a. A similar backing plate 42 is provided for the corresponding portion of the belt 15 and is similarly mounted, although in Fig. 6 the mounting ears which are mounted on the studs constituting the axes of the belts 27, 28 have been omitted for the purpose of clarity.

As shown in Fig. 6, a pair of guide plates 44, 44a are mounted just above the upper edges of the belts 15, 15a respectively. The plates are secured in position by screws 45, 45a which pass through tubular spacing studs 46, 46a, respectively into threaded apertures provided in the plate 10. The plates 44, 44a are shown formed separately as a matter of convenience and are provided with a slot 47 which accommodates the upper rotary saw 17 shown in Fig. 3. The saw as shown in the latter figure, projects beneath the plate a predetermined distance for cutting through the shell of the shrimp as it passes beneath the saw. Saw 17 is mounted on a driven shaft 49 which is mounted in a bearing 50 which is secured to upright supports 51 which in turn are secured to the plate 10. The second rotary saw 17a is journalled in a swinging frame indicated generally by numeral 53 and is biased for upward movement toward the saw 17. Such upward movement is limited at the point where the two saws will be spaced apart a short distance in the event the saws are located in the same plane. However, the saws may be offset one from the plane of the other substantially only the distance corresponding to the thickness of the saw so as to avoid clashing of the saw blades, since it is desirable that the adjacent teeth of the saws be movable into close relationship for the reason that the caudal base of a shrimp is quite small and it is desirable that the saws slit the shell completely through said base to facilitate complete removal of the shell sections by the peeler mechanism.

As stated, the saw 17a is biased for movement in an upward direction and for the purpose of avoiding forming a deep kerf in the back of the shrimp, that is, the lowermost portion thereof as it moves belly up through the mechanism, the saw 17a is provided preferably on opposed sides with discs 52 as shown in Fig. 8 which are slightly smaller in diameter than the saw. The difference in diameter between the saw and the discs enables the saw to cut kerfs in the backs of the shrimps to a predetermined depth, the peripheries of the discs 52 constituting abutments limiting the depth of the kerfs.

As viewed in Fig. 3, the lower saw 17a is in a lowermost spaced position but actually the biasing means in the form of a spring 54 normally will hold the saw at an elevation wherein the teeth thereof will overlap the teeth of the upper saw 17 or will be spaced slightly from the teeth of saw 17 if the saws are co-planar. As a shrimp body is moved forwardly by the engagement of the inner runs of the belts 15 and 15a into engagement with the two saws, the lower saw 17a will be moved downwardly by the body, thus tending to force the shrimp body upwardly against the guide plates 44, 44a. The peripheries of the discs 52 engage the shrimp body along the back and force the normally convex belly of the shrimp flat against the lower side of plates to enable the upper saw 17 to make the necessary cut along the shrimp belly. The lower saw 17a will be forced downwardly by engagement of the discs 52 with the back of the shrimp and limit the lower saw to a cut in depth corresponding to the extent that the saw teeth project radially beyond the discs. The biasing action of the saw tends to force a shrimp body upwardly against the plates as stated and hence, while the lower saw 17a is moved downwardly by the large forward end of the shrimp, the upward or belly portion of the shrimp is pressed upwardly against the plates 44, 44a as the shrimp body moves between the saws and thus the saws cooperate to cut kerfs in the upper and lower portions of the shrimp body continuously from the forward end to the extreme rear end of the body, the tail having been removed by the rotary knives 16, 16a.

Figure 4:
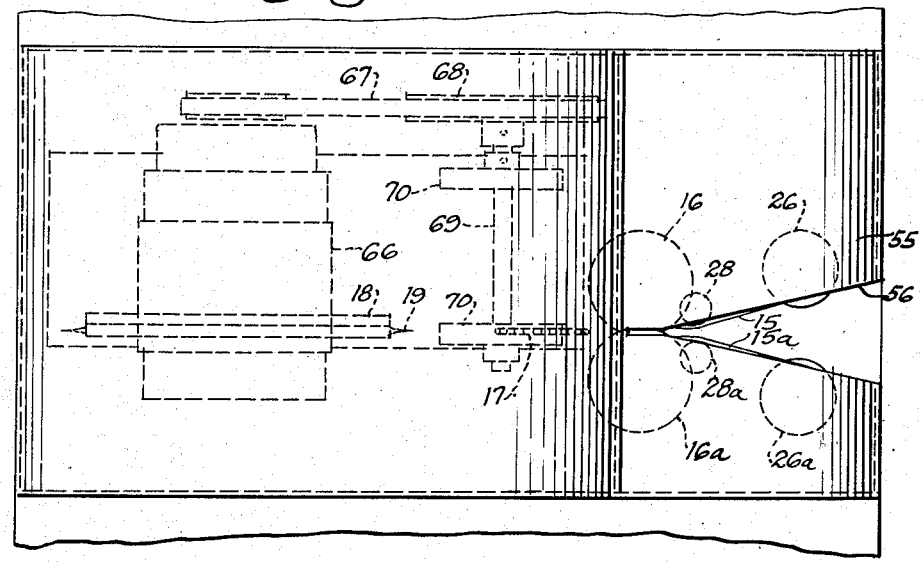
Fig. 4 is a broken plan view of the machine shown in Fig. 3.
Figure 5:
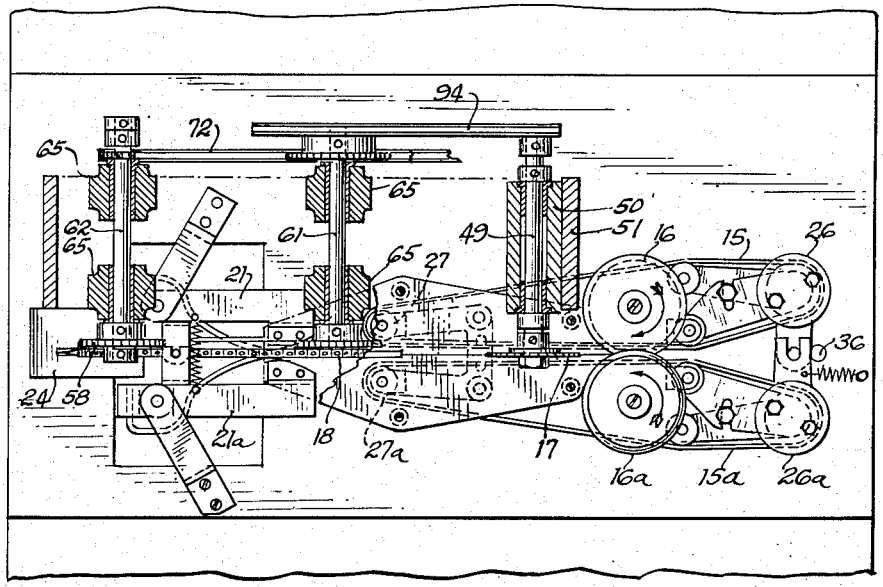
Fig. 5 is a sectional view taken on line 5—5 of Fig. 3.

In feeding the headless shrimp into the machine by hand, the operator grasps the shrimp by the tail beneath his thumb and forefinger and advances it, large end first, between the converging right-hand portions of the belts 15, 15a. There is a guard 55 in the form of a sheet metal plate which overlies the right-hand portion of the feeding belts 15, 15a as shown in Fig. 3, the guard being provided with a V-shaped slot 56 therein as shown in Fig. 4. The body of a shrimp generally is curled with the back forming the larger arc. The operator retains the tail of the shrimp in his fingers as he moves it forwardly along the V-shaped feed passage with the tail between his fingers. The narrowing of the passage from right to left prevents his fingers coming in contact with the rotary knives 16, 16a and by this arrangement, the tail will be clipped off by the cooperating overlapping blades or knives as the tail is held in the fingers as the shrimp body passes beneath the blades. The tail can be tossed aside into any suitable receptacle. The belts carry the shrimp between the saws as above-described which, while the depth of the kerfs formed thereby are limited, the kerfs extend from end to end of the shrimp notwithstanding the converging shape of the shrimp body from the forward to the rear end. The lower saw 17a cuts along the sand vein of the shrimps, thus removing the vein or making any remaining portions thereof accessible for removal usually by a washing operation after the shrimps have been shelled.

As a shrimp is carried by the belts 15, 15a to the left by section A of the machine into the range of the needles 19 of the chains 18 of section B, the needles penetrate the flesh of the shrimp through the kerfs cut by the saws and thus move the shrimp progressively to the left as viewed in Fig. 2, for example. The chains 18, 18a are carried by suitable sprockets arranged in upper and lower horizontal pairs, the upper pair being designated by reference characters 57, 58 and the lower sprockets by reference characters 59, 60. The sprockets mentioned are mounted on horizontal shafts 61, 62, 63 and 64, respectively, which are supported in suitable bearings each designated by reference character 65 in Fig. 5. Sprockets 57 and 59 are attached to the respective shafts 61 and 63 to be driven thereby while sprockets 58 and 60 are not keyed or otherwise drivingly secured to the respective shafts 62 and 64.

An electrical motor 66 located at one side of the machine operates suitable drive means for driving the belts 15, 15a, the horizontal tail severing discs 16, 16a, the vertical saws 17, 17a and the needle chains 18, 18a, each of the several pairs of elements just mentioned operating at appropriate velocities. In the particular structure illustrated, the motor, by means of a belt 67, operates a pulley 68 secured to a shaft 69 journalled in supporting bearings 70, the shaft being provided with a sprocket 71 which drives a chain 72 which effects operation of the several pairs of elements above-mentioned. As viewed in Fig. 3, the pulley 68 is driven in a counterclockwise direction by the motor 66 and hence the sprocket 71 on shaft 69 drives the chain 72 in a counterclockwise direction. The chain 72 passes beneath but in driving engagement with a drive sprocket 73 secured to shaft 61 for driving the same but passes over an idler sprocket 74 on the shaft 62. Sprocket 74 being an idler on shaft 61, the upper needle chain 18 is driven in a clockwise direction by the sprocket 73 on shaft 61. From the idler sprocket 74 on shaft 62 the chain passes around driving sprocket 75 on shaft 63 and thereby rotates the needle chain 18a in a counterclockwise direction as viewed in Fig. 3. From sprocket 75 the chain passes into driving contact with a drive sprocket 76 on shaft 64 (after passing around a tensioning sprocket 77) for driving the shaft 64. The needle bearing chains 18, 18a are driven in unison and as the needles, via the saw kerfs, penetrate the bodies of successive shrimps delivered thereto by the belts 15, 15a, the bodies are moved positively from right to left and during such movement the peelers 20, 20a engage the forward headless end of each shrimp inwardly of the forward ends of the shells which have been slit along the tops and bottoms, and strip the shell sections from the bodies. The feelers 21, 21a, as well as the peelers 20, 20a, tend to move inwardly under the action of the spring 41a, but may be moved outwardly by the shrimp bodies in accommodating the bodies therebetween and follow the longitudinal contour of the bodies as the latter are constrained by the engaging needles to move forwardly. The shells when freed from the bodies drop through a suitable opening in the plate 10 into a suitable receptacle provided for receiving the same, such as the receptacle 23.

As a shrimp body approaches the left-hand end of the chains 18, 18a between the stripper plates 24, 24a, the needles begin to withdraw from the body. As the needles of the chains withdraw from the flesh of a body, the needles pass through the slots of plates 24, 24a, as will be clear. The final withdrawal of the needles 19 occurs while the shrimp bodies are on the downwardly sloping portion of the plate 24a which results in the freed bodies being deposited by gravity in a suitable receptacle beneath the terminal portion of the curved plate, such as a washing receptacle 14, above-mentioned.

The shafts 26', 26" to which the pulleys 26, 26a are secured and which drive the belts 15, 15a are driven by any suitable means, the former in a clockwise and the latter in a counterclockwise direction as viewed in Fig. 6. As shown in Fig. 12, the lower ends of the shafts 26', 26" carry meshing gears 78, 78a of equal diameter. In the illustrated driving arrangement, a beveled pinion 79 secured to a transverse shaft 80 meshes with a similar pinion 81 secured to the lower end of shaft 26' and, therefore, as the shaft 80 is driven by a chain 82, pinion 79 on the shaft 80 will drive pinion 81 on shaft 26' and pinion 78 on shaft 26' will drive the meshing pinion 78a on shaft 26" and so drive the pulleys 26, 26a at the same velocities for operating the feed belts 15, 15a in unison and the adjacent runs thereof in the same direction.

For the purpose of driving the tail severing discs 16, 16a, the former in a clockwise direction and the latter in a counterclockwise direction as viewed in Fig. 6, the shafts 83, 83a upon the upper ends of which the discs are mounted, are provided with meshing gears 84, 84a at the lower ends, the gear 84a meshing with a pinion 85 which is in driving engagement with pinion 78a as shown in Fig. 12. The two tail severing discs are thus operated in unison upon operation of the motor 66, the shaft 80 being driven by the chain 82 from a pinion on shaft 64.

The swinging frame 53 which supports the lower saw 17a preferably is pivotally mounted on the shaft 80 and is biased in clockwise direction as viewed in Fig. 3 by spring 54 which urges it upwardly into cutting contact with the back of each shrimp moved into the operating zone of the saws 17, 17a by the conveyor or feeding belts 15, 15a. A shaft 87 to which the saw 17a is secured carries a driven pinion 88 which meshes with a larger pinion 89 on a shaft 90 carried by the frame 53. A sprocket 91 on the shaft 90 is driven by a chain 92 which in turn is driven by a sprocket 93 on the shaft 80.

The peripheral speeds of saws 17 and 17a preferably are equal, the upper saw 17 being driven by a chain 94 which passes over a drive sprocket 95 on shaft 61 and a driven sprocket 96 on the shaft 49 upon which the saw 17 is mounted. The saws, however, operate in similar directions, which is clockwise, as viewed in Fig. 3. The peripheral portions of the saws which engage a shrimp body at any instant, however, move in opposite clockwise directions. This action of the saws is desirable since the upper saw tends to urge the shrimp bodies forwardly while the direction of rotation of the lower saw 17a combined with the direction of its pivotal swing under urgence of the spring 54 about the shaft 80 as a pivot, tends to flatten out the naturally curved shrimp bodies against the lower surface of the plate 44a through a slot in which the upper saw 17 extends a distance corresponding to the depth of the kerf to be cut by said saw, preferably not more than one eighth of an inch. The plate 44a is shown supported above the plate 10 by spacers 46a. By the construction described, the shell of each shrimp body is severed throughout the length thereof by the saws, leaving the shell halves in condition to be stripped from the bodies by the peelers 20, 20a as the bodies are moved by the needle chains 18, 18a into shell removing position in section B of the machine, as above described.

As indicated above, the beheaded shrimps or headless shrimp bodies are grasped one by one by hand and fed with the beheaded end foremost into the V-shaped forward end of the machine between the conveyor belts 15, 15a, the operator holding each successive shrimp by the tail. The bodies of the shrimps are fed between the belts with the belly up and as the tail is severed, the belts carry the bodies forwardly, the belt sections moving inwardly or outwardly in unison in response to the size and contour of the shrimps as above described. As a headless and tailless shrimp body approaches the saws, the lower saw 17a and discs 52 thereon will press it upwardly against the plate 44 by reason of the discs 52 secured to the sides of the saw and insure that the shrimp is cut by the saws along the back by the lower saw as well as by the upper saw 17 along the belly. The pressure exerted against the normally curved body of the shrimp by the edges of the discs under the upward pressure exerted by the spring 54 insures that the kerfs cut by the saw will be continuous along the upper and lower extremities of the body.

As the shrimp body proceeds to the left, as viewed in Fig. 3, and approaches the needle chains 18, 18a, downward pressure is exerted on the body by the downwardly deflected portions of the plates 44, 44a which portions are slotted to receive the needles of the upper chain 18. The downward pressure exerted on successive shrimp bodies by the downwardly deflected wall portions bulges the bodies outwardly at opposed sides prior to engagement of the forward edges of the shells by the peelers 20, 20a. The ends of the peelers engage inwardly of the shell due to the guiding action of the feeler members 21, 21a and as the bodies proceed to the left under the propelling action of the needles which engage the bodies at the top and bottom, the longitudinally severed shell sections are stripped from the bodies and deposited in the lower receptacle. The peeled shrimp bodies proceed to the left and as they approach the left-hand end of the machine, are released by the needle chains and then drop into a receptacle for washing.

The lower saw 17a is designed to cut into or cut away the so-called sand veins or intestines which are located along the backs of the shrimp bodies. In some instances, some portions of the vein may remain in place but are exposed by the kerf made by the lower saw 17a and can readily be washed away by a washing operation.

While I have described a machine which cuts off the tails and removes the shells and intestine or sand vein from headless shrimp bodies and which is illustrative of the invention, it will be apparent that other rearrangements of parts and minor changes may be resorted to without departure from the scope of the invention defined by the appended claims.

I claim:

1. In a machine for peeling the shells from headless bodies of shrimps comprising a base, a pair of endless conveyors arranged in a horizontal plane on said base and having cooperating spaced apart runs providing an intermediate passage into which shrimp bodies can be fed for engagement on opposed sides by said runs for advancement of the bodies to shell slitting means, a pair of driven pulleys carried by said base around each of which one of said conveyors passes in driven relation, means operatively associated with said conveyors for rotating the pulleys in directions for driving said runs in the same direction, an idler pulley for the opposite end of each conveyor, a pair of swingable brackets each supporting one of said idler pulleys, spring means urging the brackets in directions whereby said idler pulleys and the ends of the conveyors passing around the same tend to swing each toward the other, and means interconnecting said brackets for constraining said brackets and idler pulleys to swing in unison when moved each toward the other by said spring means or when forced each away from the other against the action of said spring means by a shrimp body between said conveyor runs.

2. A device for shelling headless shrimp which have had dorsal and ventral longitudinal kerfs cut through the shells thereof, comprising a base, a pair of vertically spaced conveyors mounted on said base, and provided with needles arranged to penetrate the shrimp bodies through said kerfs for positively engaging said bodies and for advancing the bodies along the conveyors and means including a pair of swingable peeler members carried by said base, located at opposite sides of the path of travel of said bodies carried by said conveyors for engaging the inner surfaces of the severed sections of the shells at the forward end of each shrimp and means operatively associated with said peeler members for causing the peeler members to follow the inner surfaces of the shells to the tail end thereof for stripping the shells from the bodies as the latter are moved forwardly by said conveyor.

3. The structure of claim 2 wherein said shrimp bodies are kerfed by mechanism including a pair of cooperating endless driven belts arranged in longitudinally spaced relation for engaging shrimp bodies at opposed sides thereof and moving them between the belts, a pair of vertical rotary saws mounted on said base between said belts on opposed sides thereof for cutting kerfs along the upper and lower portions of the bodies for severing the shells at top and bottom throughout the length of the bodies as the bodies are moved by the belts.

4. A device for shelling headless shrimp which have had dorsal and ventral kerfs cut through the shells thereof, comprising a base, an upper and lower endless conveyor at least one of which is provided with needles aligned to penetrate shrimp bodies through said kerfs for positively engaging the bodies and for advancing the bodies along the conveyors, said conveyors being mounted on said base, and shell stripping means operatively associated with said conveyors and located on opposed sides of the paths of travel of said bodies between said conveyors, said means including movable peeler members adapted to engage the inner surfaces of the shell, each substantially midway between said kerfs on opposed sides of a shrimp body, and feeler members operatively associated with said peeler members and engaging the exterior of the shrimp bodies for locating said peeler members in shell engaging position with respect to each advancing shrimp body and for retaining the peeler members in shell peeling position with respect to said body as the same is moved between said peeler members.

5. A device for shelling headless shrimp which have had dorsal and ventral kerfs cut through the shells thereof comprising a base, a pair of endless conveyors operatively associated with said base and to which said shrimp bodies are delivered, each conveyor being provided with aligned needles arranged to penetrate the bodies via said kerfs for engaging the bodies in succession and moving the same forwardly through a shell stripping zone, and cooperating shell stripping members carried by said base and located on opposed sides of the bodies engaged by the needles, said members comprising shiftable feeler members adapted to follow the body contour from front to rear as the same are moved past said feeler members, and a peeler member cooperating with each feeler member and held thereby in a stripping engagement with the inner surface of the adjacent portion of each kerfed shell for stripping the respective sections of the shells from the moving shrimp bodies.

6. A device for shelling shrimp which have had their shells slit longitudinally, both dorsally and ventrally, comprising a base, spaced conveyor means mounted on said base, and having needles therein adapted to penetrate the flesh of the bodies via the slits for receiving the bodies successively, and means operatively associated with said conveyor means for engaging the advancing ends of the bodies as the same are conveyed by said conveyor means for stripping the shells from the bodies as the bodies are advanced.

7. The structure of claim 6 wherein said shrimp bodies are kerfed by mechanism including a pair of cooperating endless driven belts arranged in longitudinally spaced relation for engaging shrimp bodies at opposed sides thereof and moving them between the belts, a pair of vertical rotary saws mounted on said base between said belts on opposed sides thereof for cutting kerfs along the upper and lower portions of the bodies for severing the shells at top and bottom throughout the length of the bodies as the bodies are moved by the belts.

8. A device for shelling shrimp which have been slit dorsally and ventrally, longitudinally through the shells thereof, comprising a base, a pair of vertically spaced apart cooperating conveyors for receiving the shrimp bodies, said conveyors being provided with endless rows of needle points for penetrating the bodies through said slits, a pair of pivotally mounted opposed feeler members, each adapted to contact the shrimp bodies intermediate said slits at the forward end of each shrimp advanced by said conveyors, and to follow the exterior surface thereof to the trailing end of the body, and a pair of shell engaging peeler members each movable with one of said feeler members and having a pointed end disposed inwardly of the respective feeler member for engaging the inner surface of the adjacent shell section intermediate the slits for stripping the shell sections from the bodies as the same are advanced by said conveyor means.

9. The structure of claim 8 wherein the feeler members are provided with cutting edges along the outer portions thereof for severing flesh of the shrimp bodies protruding outward beyond the forward ends of the shells.

HUBERT JAGGER.

References Cited in the file of this patent

UNITED STATES PATENTS

| Number | Name | Date |
|---|---|---|
| 1,627,479 | Bucknam | May 3, 1927 |
| 2,034,691 | Bottker et al. | Mar. 24, 1936 |
| 2,147,633 | Bottker | Feb. 21, 1939 |
| 2,254,969 | Lindsey | Sept. 2, 1941 |
| 2,263,697 | Grayson | Nov. 25, 1941 |
| 2,580,992 | Biery | Jan. 1, 1952 |

FOREIGN PATENTS

| Number | Country | Date |
|---|---|---|
| 597,667 | Germany | May 31, 1934 |